May 24, 1966 E. M. BROHL 3,253,124
DOMESTIC ELECTRIC APPLIANCE
Filed Nov. 12, 1963
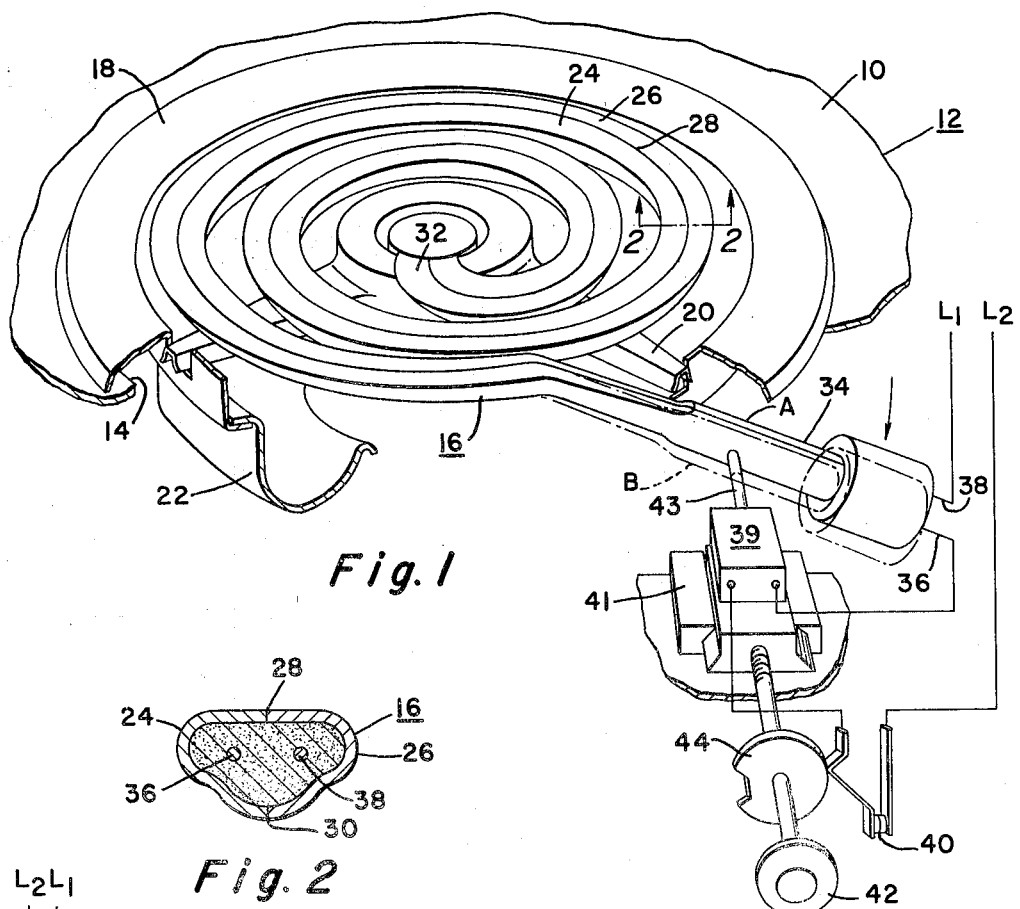
Fig. 1
Fig. 2
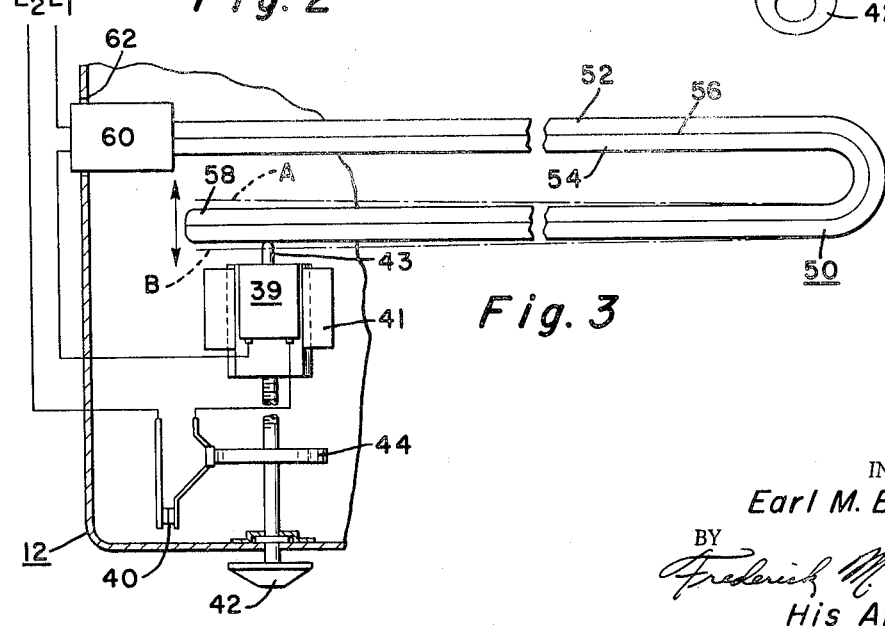
Fig. 3
INVENTOR.
Earl M. Brohl
BY
His Attorney 3,253,124
DOMESTIC ELECTRIC APPLIANCE
Earl M. Brohl, Flint, Mich., assignor to General Motors Corporation, Detroit, Mich., a corporation of Delaware
Filed Nov. 12, 1963, Ser. No. 322,871
6 Claims. (Cl. 219—449)

This invention relates to a domestic appliance and more particularly to a heating element having a bimetal sheath for infinite heat control.

The prior art controls for regulating power input to a surface cooking unit have involved intricate systems for adjustably regulating the percentage on time for the cooking unit. These controls have been in the form of auxiliary switches which are in some manner responsive to the flow of power to the cooking unit. In all of these prior art arrangements, the surface cooking unit remains as the controlled element with the switch as the power flow responsive unit doing the controlling. The invention is directed to a cooking unit or heating element which controls itself.

Accordingly, it is an object of this invention to provide a heating element which is responsive to power supply thereto for regulating said power supply.

A further object of this invention is the provision of a tubular sheathed heating element wherein the sheath is made thermally responsive for regulating the power supply to said heating element.

A more specific object of this invention is the provision of a tubular sheathed heating element wherein the sheath is comprised of different materials, thereby to create in said heating element a bimetallic control characteristic for regulating power supply to said heating element.

Further objects and advantages of the present invention will be apparent from the following description, reference being had to the accompanying drawings wherein preferred embodiments of the present invention are clearly shown.

In the drawings:

FIGURE 1 is a fragmentary perspective view with parts broken away of a spirally wound surface cooking unit formed in accordance with one form of this invention;

FIGURE 2 is a cross sectional view of the tubular sheathed heating element of this invention; and FIGURE 3 is an elevational view of an oven heating element formed in accordance with another form of this invention.

With reference now to FIGURE 1, a top wall 10 of an electric range 12 is shown provided with an opening 14 to receive a surface cooking unit 16 therein. A trim ring 18 circumscribes the opening 14 and supports a spider 20 thereacross on which the surface cooking unit 16 is carried. Beneath the cooking unit 16, a drip pan 22 may be removably positioned.

The surface cooking unit or heating element 16 is designed to control itself. Considerable advantage accrues from this invention. The heat at the pan resting on the heating element cannot raise above the controlled temperature and, therefore, burning or scorching of foods therein cannot occur. A more even heat is given off by the cooking unit and the cycling thereof is reduced because only the heat content of the cooking unit itself is involved and not that of the pan and its contents.

Turning now to FIGURE 2, a cross section of the heating element 16 formed in accordance with this invention is shown as a composite metallic tubular sheath having a first or left half 24 and a second or right half 26 joined along a continuous weld line 28 at the top thereof and along a continuous weld line 30 at the bottom thereof, both welds following the contour of the heating element. The material used in the left half 24 has a different or greater coefficient of expansion than that used in the right half 26—a factor which causes thermally responsive movement of the heating element itself. The tube can be made by welding two plates together and expanding the tube by pressure as done conventionally in expanding refrigerator tubing in roll bonded evaporators. Where the inner end 32 is affixed, as in FIGURE 1, the terminal end 34 will move in accordance with the temperature of the cooking unit sheath from a solid line position A when the unit is relatively cool to a phantom line position B when the cooking unit is heated up to the point where the power supply should be cycled off.

Within the cooking unit 16, helical resistance wires or conductors 36 and 38 packed in a suitable dielectric such as magnesium oxide are joined at the inner end 32 of the cooking unit and extend out of the tubular sheath where conductor 38 is connected to one side of the line $L_1$ and conductor 36 is connected to the other side of the line $L_2$ through a movable, snap action microswitch 39 and a master ON-OFF switch 40. The microswitch 39, in accordance with this invention, is adjusted relative to the cooking unit by a dial 42 on the control panel of the range. More particularly, the whole switch is moved in a fixed guide 41 to place the switch actuator 43 either closer to or farther from the terminal end 34, thereby to regulate the temperature limits at which the switch 39 will be opened and closed. When the cooking unit end 34 is in position A, switch 39 is closed and power is supplied to the resistance wires 36, 38. As the unit heats in response to this supplied power, the sheath thereof will start to warp due to its bimetallic construction. Depending upon the positioning of the switch actuator 43 relative to the terminal end 34, the warping of the cooking unit sheath at B will actuate the switch 39 to turn off the power supply. The cooking unit will start to cool until the terminal end thereof at A effects reenergization of the unit and the start of another on-off cycle. Such a control may also include a cam 44 for closing the master ON-OF switch 40 to condition the cooking unit 16 for temperature controlled operation.

Another embodiment of this invention is shown in FIGURE 3 for an oven heating element 50 wherein like components have identical reference numbers. The oven element 50 is tubular sheathed like the surface element 16 and may also have a cross section like that shown in FIGURE 2, although oven elements are generally cylindrical. Thus, the element is formed of metallic sheath halves 52 and 54 joined along a top weld line 56 and a bottom weld line (not shown). The sheath half 52 has a different coefficient of expansion than that of sheath half 54 so that heating thereof will cause the free end 58 of the oven heating element to move between position A when relatively cool and position B when relatively hot. Since the support end 60 of the element is attached to the oven wall 62, the movement of the free end 58 actuates the switch 39 by pushing and releasing the switch actuator 43, thereby to selectively deenergize and energize the element 50 from the power supply $L_1$, $L_2$ as set forth hereinbefore in connection with FIGURE 1. Also as for the surface unit 16, the switch 39 may be adjustably positioned relative to the free end 58 of the heating element in order to regulate the element temperature at which the power supply will be cycled.

It should now be seen that a simplified control has been invented for sheathed heating elements. By forming the sheath of differently expansible materials, the heating element is caused to flex in response to the temperature thereof and this flexing action is then used to control the power supply to the element, i.e., a self-controlled heating element.

While the embodiments of the present invention as herein disclosed constitute preferred forms, it is to be understood that other forms might be adopted.

What is claimed is as follows:

1. In a cooking appliance combination with a power supply switch means, a tubular self-controlled sheathed heating element adapted as a single source of cooking heat for said cooking appliance and comprising a tubular sheath having a fixed end and a free end and enclosing a resistance element spaced from said sheath by a dielectric material and energizable through said switch means, said tubular sheath being formed with a first portion and a second portion having respective contiguous edges joined together continuously throughout the length of the heating element, said first portion having a different coefficient of expansion than said second portion whereby said free end of said heating element is caused to move thermally responsively when said resistance element is energized, said switch means having actuator means connected for actuation with said free end of said heating element and actuatable by the movement of said free end to thermally responsively energize and de-energize said heating element whereby the energization and deenergization of said heating element is accomplished without auxiliary thermostatic means.

2. The combination of claim 1 wherein said switch means includes means for adjusting said actuator means to position said actuator means relative to said free end thereby to adapt said heating element for infinitely variable power supply thereto.

3. The combination of claim 1 wherein said tubular sheath is spirally wound with said fixed end at the center thereof to form a surface cooking unit.

4. The combination of claim 1 wherein said tubular sheath is formed of reversely bent straight sections with said fixed end adapted for attachment to a wall to form an oven heating element.

5. In a heating appliance combination with an energy supply control means, a self-controlled tubular sheathed heating element adapted as a single source of heat for said appliance and comprising a tubular sheath having a fixed portion and a free portion and enclosing a heat producing means controllable through said control means, said tubular sheath being formed with a first portion and a second portion having respective contiguous edge sections joined together at least at spaced points throughout the length of the heating element, said first portion having a different coefficient of expansion than said second portion whereby said free portion of said heating element is caused to move thermally responsively when said heat producing means is controlled to produce heat, said control means having actuator means regulating the heat produced by said heat producing means and connected for actuation with said free portion of said heating element and actuatable by the movement of said free portion to thermally responsively control the temperature of said heating element without auxiliary thermostatic means.

6. The combination of claim 5 wherein said control means includes means for adjusting said actuator means relative to said free portion thereby to adapt said heating element for infinitely variable power supply thereto.

References Cited by the Examiner

UNITED STATES PATENTS

| | | | |
|---|---|---|---|
| 1,046,777 | 12/1912 | Hadaway | 60—23 |
| 2,352,439 | 6/1944 | Landon | 60—23 |
| 2,396,238 | 3/1946 | Beck | 219—449 |
| 2,850,870 | 9/1958 | Martin | 338—67 |

RICHARD M. WOOD, *Primary Examiner.*

L. H. BENDER, *Assistant Examiner.*